(12) United States Patent
Tsuge et al.

(10) Patent No.: US 7,590,483 B2
(45) Date of Patent: Sep. 15, 2009

(54) TRAFFIC INFORMATION MANAGEMENT SYSTEM

(75) Inventors: Masakuni Tsuge, Wako (JP); Toshihide Yofu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 758 days.

(21) Appl. No.: 10/864,859

(22) Filed: Jun. 7, 2004

(65) Prior Publication Data

US 2004/0249562 A1    Dec. 9, 2004

(30) Foreign Application Priority Data

Jun. 5, 2003   (JP) .............................. 2003-160257

(51) Int. Cl.
*G08G 1/00* (2006.01)
(52) U.S. Cl. ...................... 701/117; 340/933
(58) Field of Classification Search ................. 701/117, 701/118, 119
See application file for complete search history.

(56) References Cited

U.S. PATENT DOCUMENTS

| | | | |
|---|---|---|---|
| 5,257,023 A * | 10/1993 | Furuya | 340/995.13 |
| 5,845,227 A * | 12/1998 | Peterson | 701/209 |
| 6,256,577 B1 * | 7/2001 | Graunke | 701/117 |
| 6,862,524 B1 * | 3/2005 | Nagda et al. | 701/209 |
| 6,879,907 B2 * | 4/2005 | Feldman et al. | 701/117 |
| 2003/0073406 A1 * | 4/2003 | Benjamin et al. | 455/41 |
| 2006/0111833 A1 * | 5/2006 | Feldman et al. | 701/117 |

\* cited by examiner

*Primary Examiner*—Khoi Tran
*Assistant Examiner*—Nicholas Kiswanto
(74) *Attorney, Agent, or Firm*—Lahive & Cockfield, LLP; Anthony A. Laurentano

(57) ABSTRACT

To provide a system that can provide traffic information to drivers of automobiles or the like with high prediction precision. In a traffic information management system according to the present invention, a first processing unit 110 recognizes a transition pattern of the necessary travel time for an automobile 20 for each unit road. A second processing unit 120 recognizes a route including one or more unit roads by communicating with a navigation system 200. For each unit road included in the route, a third processing unit 130 searches for a "resembling pattern" that resembles a "reference pattern" from a "past pattern". A fourth processing unit 140 predicts the necessary travel time required for the automobile to travel the route or a unit road included in the route based on the resembling pattern. A communication processing unit 150 transmits traffic information including the predicted necessary travel time to the navigation system 200.

27 Claims, 6 Drawing Sheets

TRAFFIC INFORMATION MANAGEMENT SYSTEM

BACKGROUND OF THE INVENTION

1. Field of the Invention

The present invention relates to a system for managing road traffic information.

2. Description of the Related Art

As described in Japanese Patent Laid-Open No. 2002-298281, for example, there has been proposed a method for predicting the traffic volume in order to decrease the traffic congestion or the like.

According to this method, traffic volume patterns, referred to as accumulated traffic volume patterns, are stored in a memory on a daily basis. Then, with respect to a common time zone, such as from 10 o'clock to 11 o'clock, an accumulated traffic volume pattern which resembles the traffic volume pattern of the intended day for traffic volume prediction is searched for and extracted from the memory. Then, based on the extracted accumulated traffic volume pattern, the traffic volume within a predetermined time after a prediction point is predicted.

However, when comparison between the traffic volume pattern for the intended day and the accumulated traffic volume pattern is made only with respect to a common time zone, the accumulated traffic volume pattern to be extracted may bear less resemblance to the traffic volume pattern. Thus, the precision of prediction about the traffic volume is reduced, and the intended purpose, such as to decrease the traffic congestion, cannot be achieved effectively.

SUMMARY OF THE INVENTION

Thus, an object of the present invention is to provide a system that can provide traffic information to drivers of automobiles or the like with high prediction precision.

In order to attain the object, a traffic information management system according to the present invention is characterized in that it comprises: first processing means for recognizing a transition pattern of the necessary travel time for a mobile unit for each unit road; second processing means for recognizing a route for the mobile unit including one or more unit roads by communicating with an instrument mounted on the mobile unit; third processing means for searching, for each unit road included in the route recognized by the second processing means, for a resembling pattern that resembles a reference pattern recognized by the first processing means within a reference time zone in a past pattern recognized by the first processing means within a past time zone that precedes the reference time zone and has the same duration as the reference time zone; fourth processing means for predicting the necessary travel time required for the mobile unit to travel the route recognized by the second processing means or a unit road included in the route based on the resembling pattern retrieved by the third processing means; and communication processing means for transmitting traffic information including the necessary travel time predicted by the fourth processing means to a navigation system mounted on the mobile unit for which the route is recognized by the second processing means.

In the traffic information management system according to the present invention, the first processing means recognizes a transition pattern of the necessary travel time for a mobile unit for each unit road. Here, the term "necessary travel time" refers to not only the necessary travel time for the mobile unit to travel from one end to the other of a route but also the necessary travel time for the mobile unit on a route to travel a unit distance.

Besides, the second processing means recognizes a route for the mobile unit including one or more unit roads by communicating with an instrument mounted on the mobile unit. Furthermore, for each unit road included in the route recognized by the second processing means, the third processing means searches a "past pattern" for a "resembling pattern" that resembles a "reference pattern". Here, the "reference pattern" and "past pattern" are transition patterns of the necessary travel time recognized by the first processing means within a "reference time zone" and "past time zone", respectively, and the past time zone precedes the reference time zone and has the same duration as the reference time zone.

In addition, the fourth processing means predicts the time required for the mobile unit to travel the route recognized by the second processing means or a unit road included in the route.

Furthermore, the communication processing means transmits traffic information including the necessary travel time predicted by the fourth processing means to a navigation system mounted on the mobile unit for which the route is recognized by the second processing means.

The past time zone is not subjected to any limitation by the position of reference time zone in one day (24 hours), such as a limitation that the past time zone should agree with the reference time zone in a day preceding the day including the relevant reference time zone. Therefore, the possibility that a past pattern resembling the reference pattern is retrieved increases, and the prediction precision of the necessary travel time is improved. In addition, it is possible to let the driver know a more precise predicted necessary travel time for a part or whole of the route via the navigation system.

In the present invention, the statement that a component X "recognizes" an object Y means that the component X measures the object Y, the component X read the object Y from a storage device or an external terminal, the component X receives the object Y measured by an external instrument or the like via a network, the component X derive the object Y from basic information by calculation, and so on.

Furthermore, the traffic information management system according to the present invention is characterized in that the first processing means recognizes the transition pattern of the necessary travel time for the mobile unit for each unit road by communicating with an instrument which is installed on the road and is capable of detecting the velocity of the mobile unit on the road or the number of mobile units passing by the instrument per unit time.

In the traffic information management system according to the present invention, the first processing means recognizes the transition pattern of the necessary travel time for the mobile unit for each unit road by communicating with an instrument installed on the road.

Furthermore, the traffic information management system according to the present invention is characterized in that the first processing means recognizes the transition pattern of the necessary travel time for the mobile unit for each unit road by communicating with an instrument which is mounted on the mobile unit and is capable of determining the position of the mobile unit.

In the traffic information management system according to the present invention, the first processing means recognizes the transition pattern of the necessary travel time for the unit road along which the mobile unit has traveled by communicating with an instrument mounted on the mobile unit.

Furthermore, the traffic information management system according to the present invention is characterized in that the second processing means recognizes a current position or departure position and a destination position of the mobile unit by communicating with the navigation system on the mobile unit and then determines the route for the mobile unit leading from the current position or departure position to the destination position.

In the traffic information management system according to the present invention, the second processing means allows the driver to know, via the navigation system, the predicted necessary travel time for the mobile unit for a part or whole of the route leading from the current position or departure position to the destination position of the mobile unit.

Furthermore, the traffic information management system according to the present invention is characterized in that the second processing means communicates with the navigation system on the mobile unit and recognizes the route for the mobile unit leading from a current position or departure position to a destination position, the route being determined by the navigation system.

In the traffic information management system according to the present invention, the second processing means allows the driver to know, via the navigation system, the predicted necessary travel time for the mobile unit for the route determined by the navigation system.

Furthermore, the traffic information management system according to the present invention is characterized in that the second processing means recognizes a plurality of routes for the mobile unit and selects any of the routes for the mobile unit based on the necessary travel time predicted by the fourth processing means, and the communication processing means transmits, to the navigation system on the mobile unit, the traffic information including the route selected by the second processing means or the necessary travel time for the route predicted by the fourth processing means.

In the traffic information management system according to the present invention, a route is selected from a plurality of routes based on the predicted necessary travel time, and the traffic information including the predicted necessary travel time for the selected route is transmitted to the navigation system. Thus, the driver can know, via the navigation system, only the predicted necessary travel time for a route for which a long or short necessary travel time is predicted.

Furthermore, the traffic information management system according to the present invention is characterized in that the third processing means recognizes the length of each unit road included in the route recognized by the second processing means and determines the duration of the reference time zone for the unit road based on the length of the unit road.

In the traffic information management system according to the present invention, the duration of the reference time zone is set based on the length of the unit road. Thus, even if a factor depending on the length of the route for the mobile unit varies, the prediction precision for the necessary travel time is less affected by that. Thus, the prediction precision for the necessary travel time for each unit road included in the route for the mobile unit can be improved. In addition, the necessary travel time for the mobile unit for the route can be predicted with high precision.

Furthermore, the traffic information management system according to the present invention is characterized in that the third processing means searches for the resembling pattern resembling the reference pattern in the past pattern recognized by the first processing means within the past time zone which is shifted from the reference time zone by a predetermined time difference or less.

In the traffic information management system according to the present invention, taking into consideration the fact that the possibility that the condition of a factor that affects the prediction of the necessary travel time is changed becomes higher as time goes on, the third processing unit searches for a resembling pattern in the past pattern within the past time zone which is shifted from the reference time zone by a predetermined time difference or less. Thus, the possibility is avoided that the prediction precision for the necessary travel time is reduced because of prediction of the necessary travel time being based on a past pattern within a past time zone which is too long before the reference time zone.

Furthermore, the traffic information management system according to the present invention is characterized in that the third processing means recognizes the resemblance between the reference pattern and the past pattern and retrieves, as the resembling pattern, the past pattern for which the resemblance to the reference pattern is equal to or higher than a predetermined threshold.

In the traffic information management system according to the present invention, the third processing means predicts the necessary travel time for each unit road based on the past pattern for which the resemblance to the reference pattern is equal to or higher than a predetermined threshold. Thus, the prediction precision for the necessary travel time for the mobile unit for each unit and, therefore, for the route including the unit road(s) is improved.

Furthermore, the traffic information management system according to the present invention is characterized in that the third processing means determines the predetermined threshold for the past pattern within the past time zone in accordance with the time difference between the reference time zone and the past time zone.

In the traffic information management system according to the present invention, taking into consideration the fact that the prediction precision for the necessary travel time is likely to decrease if the prediction is based on a past pattern within a past time zone which is too long before the reference time zone, the predetermined threshold is set in accordance with the time difference between the reference time zone and the past time zone. Since a resembling pattern is retrieved with reference to the predetermined threshold, and the necessary travel time is predicted based on the resembling pattern, the prediction precision can be prevented from being decreased.

Furthermore, the traffic information management system according to the present invention is characterized in that the communication processing means transmits, to the navigation system on the mobile unit, the traffic information including the degree of resemblance between the reference pattern and the resembling pattern recognized by the third processing means.

With the traffic information management system according to the present invention, the driver can know the degree of resemblance between the reference pattern and the past pattern via the navigation system and, thus, can estimate the prediction precision for the necessary travel time based on the degree of resemblance.

Furthermore, the traffic information management system according to the present invention is characterized in that, for successive i-th unit roads (i=1, 2, . . . ) included in the route recognized by the second processing means, based on the resembling pattern retrieved by the third processing means, the fourth processing means predicts the necessary travel time $\tau_1$ for the mobile unit for a first unit road and predicts the necessary travel time $\tau_{i+1}$ for an (i+1)-th unit road at a point in time at least $\Sigma_{j=1\sim i}\tau_j$ after the current time, where $\Sigma_{j=1\sim i}\tau_j$ is the sum of the predicted necessary travel times for the first unit road to an i-th unit road.

In the traffic information management system according to the present invention, the necessary travel time $\tau_{i+1}$ for the mobile unit for the (i+1)-th unit road is predicted taking into consideration the sum ($\Sigma\tau_j$) of the predicted necessary travel times $\tau_j$ for the first to i-th unit roads.

Furthermore, the traffic information management system according to the present invention is characterized in that the communication processing means transmits, to the navigation system on the mobile unit, the traffic information including the necessary travel times $\tau_i$ for the i-th unit roads or the sum ($\Sigma_{j=1\sim i}\tau_j$) of the necessary travel times for the first to i-th unit roads predicted by the fourth processing means.

With the traffic information management system according to the present invention, the driver can know the length of the total ($\Sigma\tau_j$) of the predicted necessary travel times $\tau_j$ for the first to i-th unit roads via the navigation system. It is expected that, as the total predicted time $\Sigma\tau_j$ becomes longer, the actual time of arrival at the (i+1)-th unit road is more likely to deviate from the total predicted time, and the prediction precision for the necessary travel time $\tau_{i+1}$ decreases. Thus, the user can estimate the degree of prediction precision for the necessary travel time $\tau_{i+1}$ based on the total predicted time $\Sigma\tau_j$.

DETAILED DESCRIPTION OF THE PREFERRED EMBODIMENTS

A traffic information management system according to an embodiment of the present invention will be described with reference to the drawings.

Figure 1:
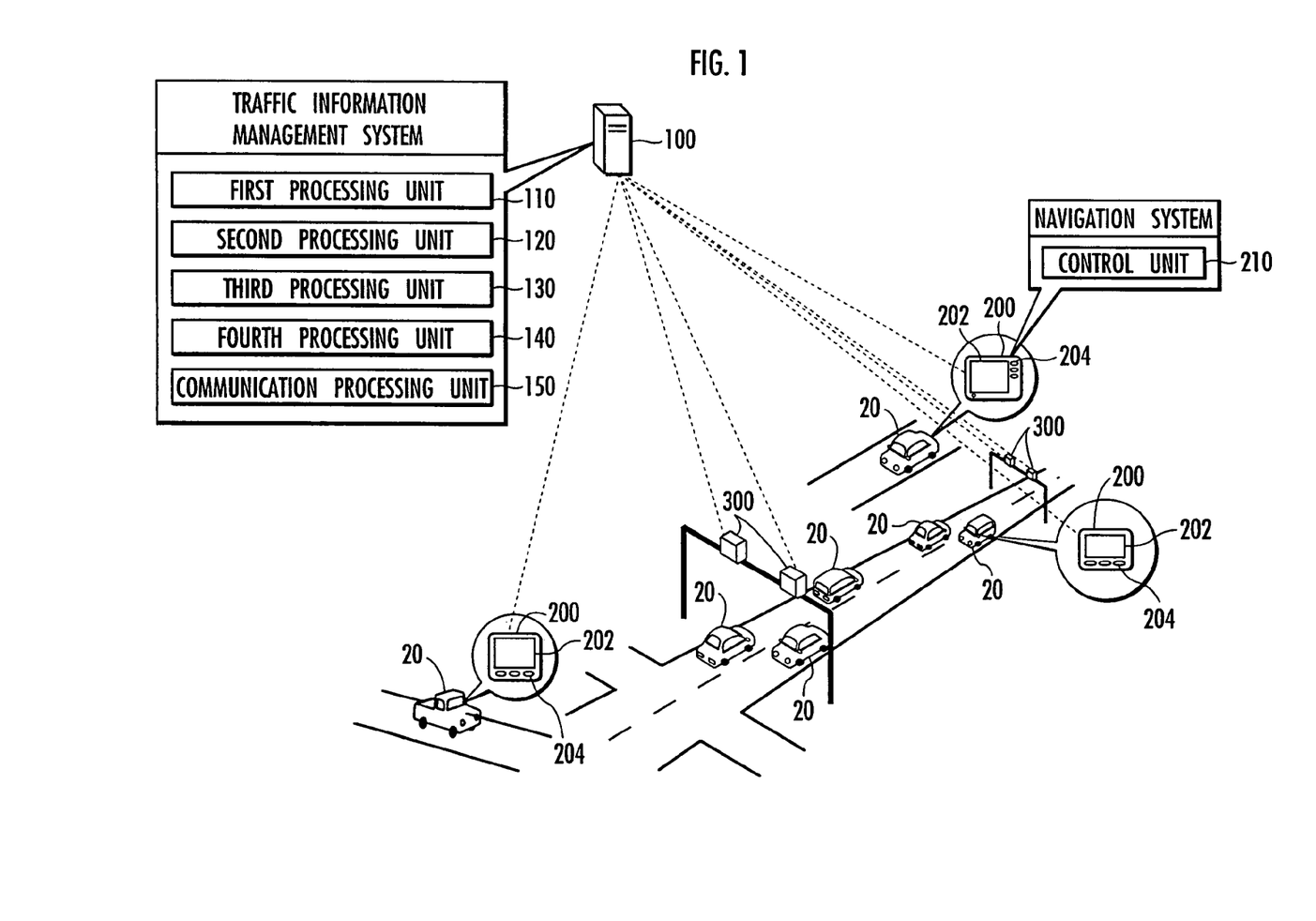
FIG. 1 schematically shows a configuration of a traffic information management system according to an embodiment of the present invention.

FIG. 1 schematically shows a configuration of the traffic information management system according to the embodiment of the present invention. FIGS. 2 to 6 are diagrams for illustrating functions of the traffic information management system according to the embodiment of the present invention.

The traffic information management system according to the embodiment of the present invention shown in FIG. 1 comprises a traffic information management server (referred to as a server, hereinafter) 100 capable of communicating, via a network, with a navigation system 200 mounted on an automobile (mobile unit) 20 and a vehicle detecting instrument 300 installed on the road.

The traffic information management system shown in FIG. 1 comprises a first processing unit 110, a second processing unit 120, a third processing unit 130, a fourth processing unit 140 and a communication processing unit 150. The units each comprise a CPU, a ROM, a RAM and other various electronics as hardware.

By communicating with a vehicle detecting instrument 300 directly or indirectly via a VICS center or the like, the first processing unit 110 recognizes a transition pattern of the necessary travel time for a mobile unit traveling a "first road" on which the vehicle detecting instrument 300 is installed. In addition, by communicating with the navigation system 200 on the automobile 20, the first processing unit 110 recognizes a transition pattern of the necessary travel time for the automobile 20 traveling mainly a "second road" on which no vehicle detecting instrument 300 is installed. Furthermore, the first processing unit 110 stores the transition pattern of the necessary travel time for the automobile 20 in a storage device (not shown) on a unit road basis.

The second processing unit 120 receives, from the navigation system 200, current position data for specifying the current position of the automobile 20 (or departure position data for specifying the departure position thereof) and destination position data for specifying the destination position. In addition, the second processing unit 120 recognizes a route leading from a departure position $x_0$ to a destination position $x_n$ and an i-th unit road $L_i$ (i=1, 2, . . . , n) included in the route, based on the departure position data and destination position data received from the navigation system 200 and a "map data" stored in the storage device (not shown).

For each of the unit roads $L_i$ included in the route recognized by the second processing unit 120, the third processing unit 130 searches a "past pattern" for a "resembling pattern" which resembles to a "reference pattern".

The fourth processing unit 140 predicts the "necessary travel time" for the automobile 20 for each unit road $L_i$, based on the resembling pattern retrieved by the third processing unit 130.

The communication processing unit 150 transmits the traffic information including the necessary travel time predicted by the fourth processing unit 140 to the navigation system 200 on the automobile 20 for which the route has been recognized by the second processing unit 120.

The navigation system 200 comprises an image display panel 202, a manipulation button 204, and a control unit 210 composed of a microcomputer.

The control unit 210 determines the current position of the automobile 20 based on an acceleration change of the automobile 20 sensed by the GPS or a gyro sensor (not shown). In addition, the control unit 210 determines the travel direction or velocity of the automobile 20 based on the output of the gyro sensor or a vehicle speed sensor (not shown). Furthermore, the control unit 210 recognizes the destination position of the automobile 20 which is set by the driver or the like manipulating the button 204.

In addition, the control unit 210 makes the navigation system 200 transmit the current position data and destination position data to the server 100. In addition, the control unit 210 receives traffic information about the "first road" from the VICS center (not shown) via an FM broadcasting station or a beacon (not shown). Furthermore, by the action of the control unit 210, the traffic information about the first road or the like is stored in the storage device (not shown).

In addition, the control unit 210 displays traffic information determined based on the traffic information data transmitted from the server 100 to the navigation system 200, the current position of the automobile 20 or the like on the image display panel 202.

Now, functions of the traffic information management system configured as described above will be described.

Figure 2:
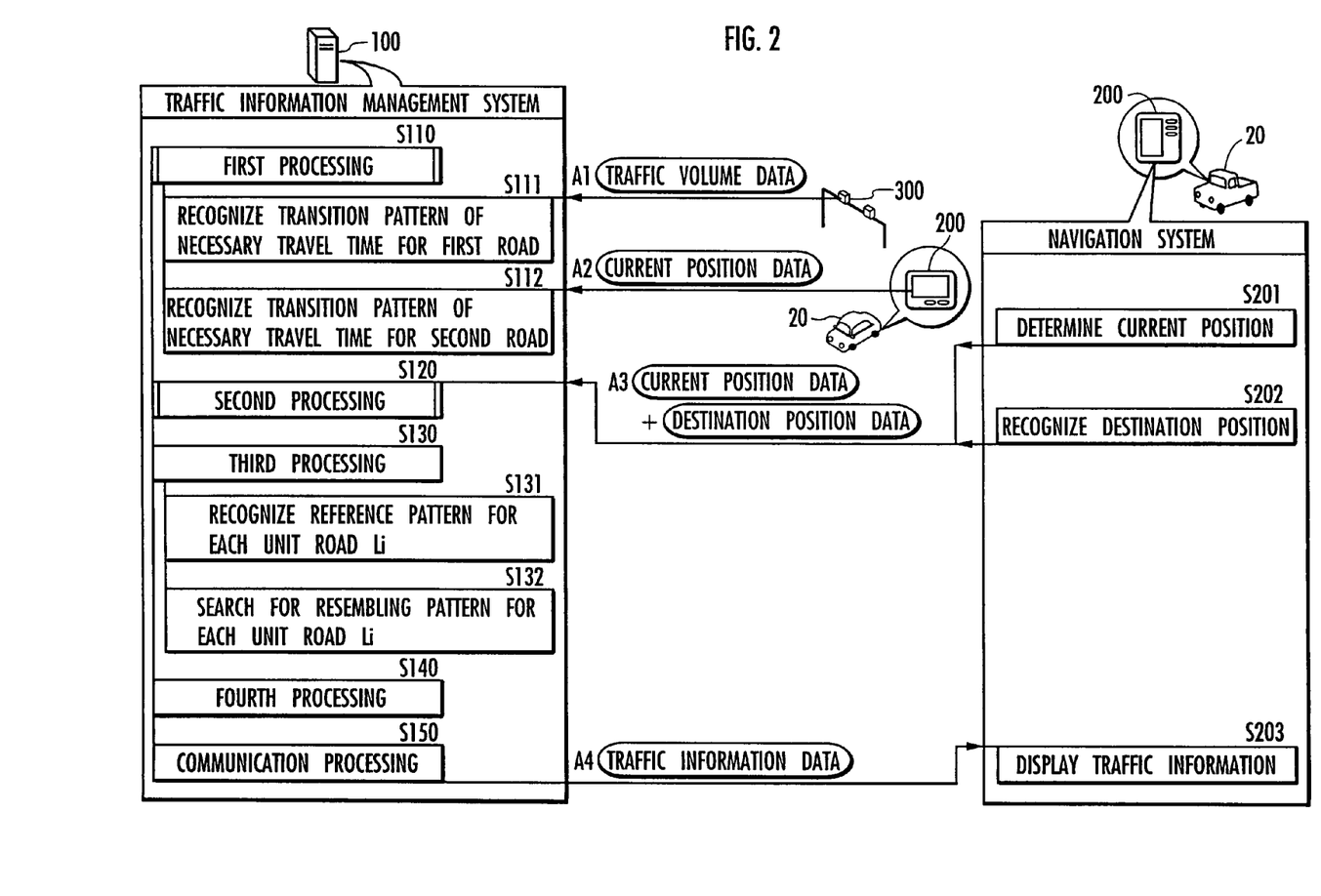
FIG. 2 is a diagram for illustrating functions of the traffic information management system according to the embodiment of the present invention.

First, the first processing unit 110 conducts a "first processing", in which transition patterns of the necessary travel time of the automobile 20 for the first and second roads are recognized on a unit-road basis (step S110 in FIG. 2).

Specifically, the vehicle detecting instrument 300 installed on the first road, such as an expressway or major arterial road, measures the traffic volume of automobiles 20 and transmits "traffic volume data" that specifies the measured traffic volume to the server 100 (as indicated by the arrow A1 in FIG. 2). Besides, based on the traffic volume data, the first processing unit 110 recognizes the transition pattern of the necessary travel time for each of the unit roads, such as a link, included in the first road (step S111 in FIG. 2). Furthermore, the first processing unit 110 receives identification data for identifying each unit road and determines which unit road is associated with the traffic volume data based on the identification data.

Besides, the control unit 210 in the navigation system 200 determines the current position of the automobile 20 and transmits the "current position data" that specifies the determined current position to the server 100 (as indicated by the arrow A2 in FIG. 2). Furthermore, based on a temporal change of the current position specified by the current position data and the map data stored in the storage device, the first processing unit 110 successively recognizes the necessary travel time for each of the unit roads in the second road, thereby recognizing the transition pattern of the necessary travel time on a unit-road basis (step S112 in FIG. 2). Alternatively, the first processing unit 110 may successively recognize the necessary travel time for each of the unit roads by performing a statistical processing concerning the necessary travel time for a plurality of automobiles 20 on a unit-road basis. Then, the first processing unit 110 receives identification data for identifying the automobile 20 or navigation system 200 from the navigation system and determines, based on the identification data, which automobile 20 is associated with the current position.

Figure 3:
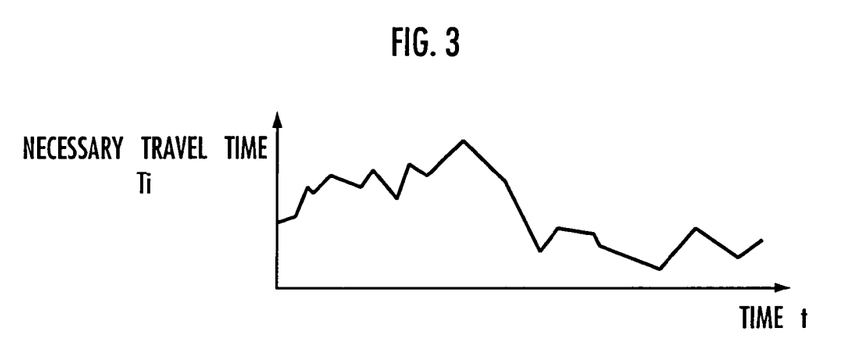
FIG. 3 is a diagram for illustrating functions of the traffic information management system according to the embodiment of the present invention.

The transition pattern of the necessary travel time $T_i$ for an i-th unit road $L_i$ recognized by the first processing unit 110 varies with time (t) as shown in FIG. 3, for example. Here, the "necessary travel time $T_i$" means the necessary travel time for the automobile 20 on the i-th unit road $L_i$ to travel a unit distance, such as 100 m or 1 km. Alternatively, the necessary travel time $T_i$ may be the necessary travel time for the automobile 20 to travel from one end of the i-th unit road $L_i$ (or the end point of the (i−1)-th unit road $L_{i-1}$) to the other end thereof (or the start point of the (i+1)-th unit road $L_{i+1}$).

Furthermore, the control unit 210 in the navigation system 200 determines the current position of the automobile 20 (step S201 in FIG. 2). In addition, the control unit 210 recognizes the destination position of the automobile 20 which is set by the driver or the like manipulating the button 204 (step S202 in FIG. 2). In addition, the control unit 210 transmits the "current position data" that specifies the current position (at the time of setting of the destination position) and the "destination position data" that specifies the destination position to the server 100 (as indicated by the arrow A3 in FIG. 2).

Figure 4:
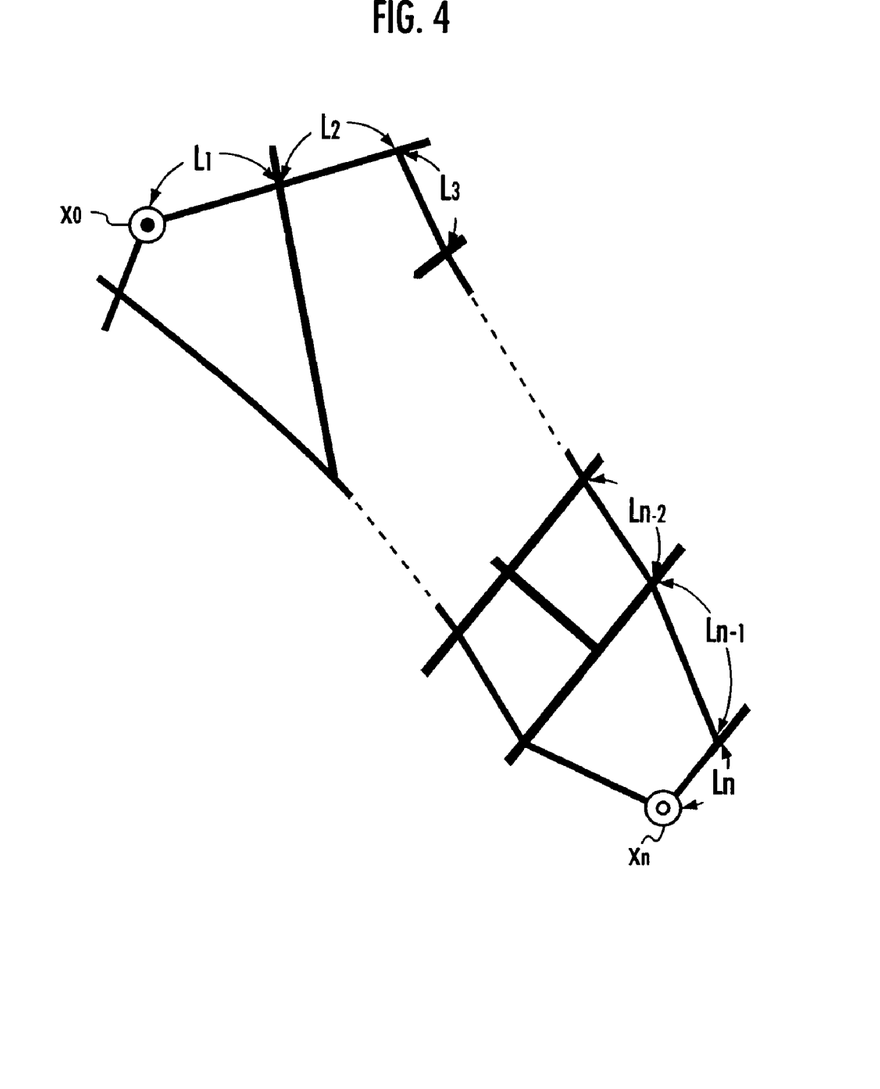
FIG. 4 is a diagram for illustrating functions of the traffic information management system according to the embodiment of the present invention.
Figure 5:
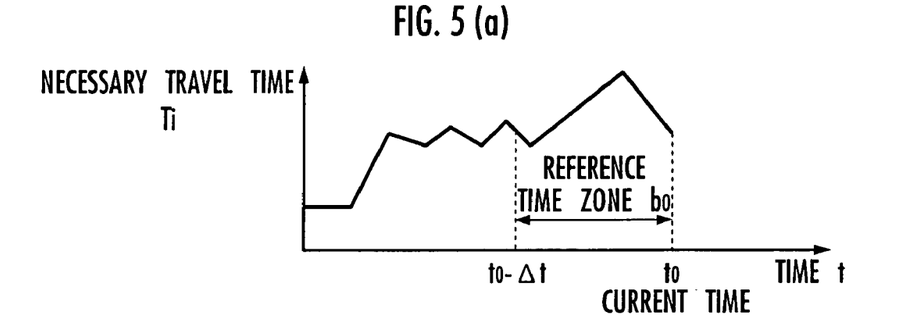
FIG. 5 is a diagram for illustrating functions of the traffic information management system according to the embodiment of the present invention.

In response to this, the second processing unit 120 conducts a "second processing" (step S120 in FIG. 2). Specifically, as shown in FIG. 4, the second processing unit 120 determines a route leading from a current position $x_0$ specified by the current position data, which is transmitted from the navigation system 200 to the server 100, to a destination position $x_n$ specified by the destination position data and reads (recognizes), from the storage device, the i-th unit roads $L_i$ included in the route. At this time, the second processing unit 120 receives the identification data for identifying the automobile 20 or navigation system 200 from the navigation system 200 and, based on the identification data, determines which automobile 20 is associated with the current position and destination position. The i-th unit roads $L_i$ (i=1, 2, ..., n) may be all included in the first or second road, or some of the i-th unit roads $L_i$ may be included in the first road and the other be included the second road. For example, of a first unit road $L_1$ to an n-th unit road $L_n$ constituting the route for the automobile 20 leading from the current position $x_0$ to the destination position $x_n$ shown in FIG. 4, a third unit road $L_3$ to an (n−1)-th unit road $L_{n-1}$ may be included in the "first road", and the first unit road $L_1$, the second unit road $L_2$ and the n-th unit road $L_n$ be included in the "second road".

Alternatively, the second processing unit 120 may communicate with the navigation system 200 and recognize a recommended route from the current position $x_0$ to the destination position $x_n$ which is set by the navigation system 200 based on the traffic information about the first road or the like.

Then, the third processing unit 130 conducts a "third processing" (step S130 in FIG. 2). Specifically, the third processing unit 130 recognizes a reference pattern $p_0$, such as one shown in FIG. 5(a), for each unit road $L_i$ (step S131 in FIG. 2). The reference pattern $p_0$ is a transition pattern, for a reference time zone $b_0$, of the necessary travel time $T_i$ for the automobile 20 recognized by the second processing unit 120 for each unit road $L_i$. The reference time zone $b_0$ is a time zone having a duration of $\Delta t$ and ending at the current time $t_0$. In addition, the third processing-unit 130 recognizes the length of each unit road $L_i$ included in the route recognized by the second processing unit 120 based on the map data stored in the storage device, for example, and determines the duration $\Delta t$ of the reference time zone for each unit road $L_i$ based on the length of the unit road.

In addition, for each unit road $L_i$, the third processing unit 130 searches a past pattern $p_k$ shown in FIG. 5(b) for a pattern resembling to the reference pattern (step S132 in FIG. 2). The past pattern $p_k$ is a transition pattern, for a past time zone $b_k$, of the necessary travel time $T_i$ for the automobile 20 recognized by the second processing unit 120 for each unit road $L_i$. The past time zone $b_k$ is a time zone having the duration $\Delta t$ as that of the reference time zone $b_0$ and ending at the a time $t_k$ preceding the current time $t_0$ (that is, the past time zone $b_k$ precedes the reference time zone $b_0$). In this step, the third processing unit 130 searches the past pattern recognized by the first processing unit 110 for a resembling pattern within the past time zone $b_k$ which is shifted from the reference time zone $b_0$ by a "predetermined time difference" or less.

In searching for a resembling pattern (step S132 in FIG. 2), the third processing unit 130 determines the "resemblance" between the reference pattern $p_0$ (shown by the dashed line in FIG. 5(b)) and the past pattern $p_k$ (shown by the solid line in FIG. 5(b)). The resemblance is determined as a decreasing function using as a variable the accumulated or integral value of deviations between the patterns $p_0$ and $p_k$ (shown by the shaded area in FIG. 5(b)).

In addition, based on the time difference between the reference time zone $b_0$ and the past time zone $b_k$, the third processing unit 130 sets a "predetermined threshold" for the past pattern $p_k$ within the past time zone $b_k$. The predetermined threshold is set higher as the time difference increases. The third processing unit 130 retrieves, as a "resembling pattern", a past pattern $p_k$ for which the "resemblance" to the reference pattern $p_0$ is equal to or higher than the "predetermined threshold" (that is, the shaded area in FIG. 5(b) is equal to or less than a predetermined value).

Then, the fourth processing unit 140 conducts a "fourth processing" (step S140 in FIG. 2). Specifically, based on the resembling pattern retrieved by the third processing unit 130, the fourth processing unit 140 predicts the necessary travel time $\tau_i$ for the automobile 20 for each unit road $L_i$.

Specifically, when the past pattern $p_k$ shown in FIG. 5(b) is retrieved as a resembling pattern by the third processing unit 130, the pattern of the necessary travel time after the current time $t_0$ is predicted to be the same as the pattern of the necessary travel time after the end time $t_k$ of the past time zone $b_k$, as shown by the dashed line in FIG. 5(c).

Then, based on the predicted pattern (shown by the dashed line in FIG. 5(c)), the fourth processing unit 140 predicts the necessary travel time $\tau_1$ for the automobile 20 for the first unit road $L_1$ at the current time to or a predetermined time $\tau_0$ after the current time. Furthermore, the fourth processing unit 140 predicts the necessary travel time $\tau_{i+1}$ for the automobile 20 for the (i+1)-th unit road $L_{i+1}$ after elapsing of a total of the predetermined time $\tau_0$ and the sum of the predicted necessary travel times $\tau_j$ for the first unit road $L_1$ to the i-th unit road $L_i$ ($\tau_{j=1-i}\tau_j$) after the current time to (see FIG. 5(c)).

Then, the communication processing unit 150 conducts a "communication processing" (step S150 in FIG. 2). Specifically, the communication processing unit 150 transmits "traffic information data" that specifies the traffic information including the predicted necessary travel time $\tau_i$ for each unit road Li and the predicted necessary travel time $\Sigma\tau_j$ for the route including the unit roads $L_j$ (j=1, 2, . . . ), which are predicted by the fourth processing unit 140, to the navigation system 200 on the automobile 20 the route of which is recognized by the second processing unit 120 (as indicated by the arrow A4 in FIG. 2). The traffic information includes the degree of resemblance between the reference pattern $p_0$ and the resembling pattern $p_k$ recognized by the third processing unit 130.

Figure 6:
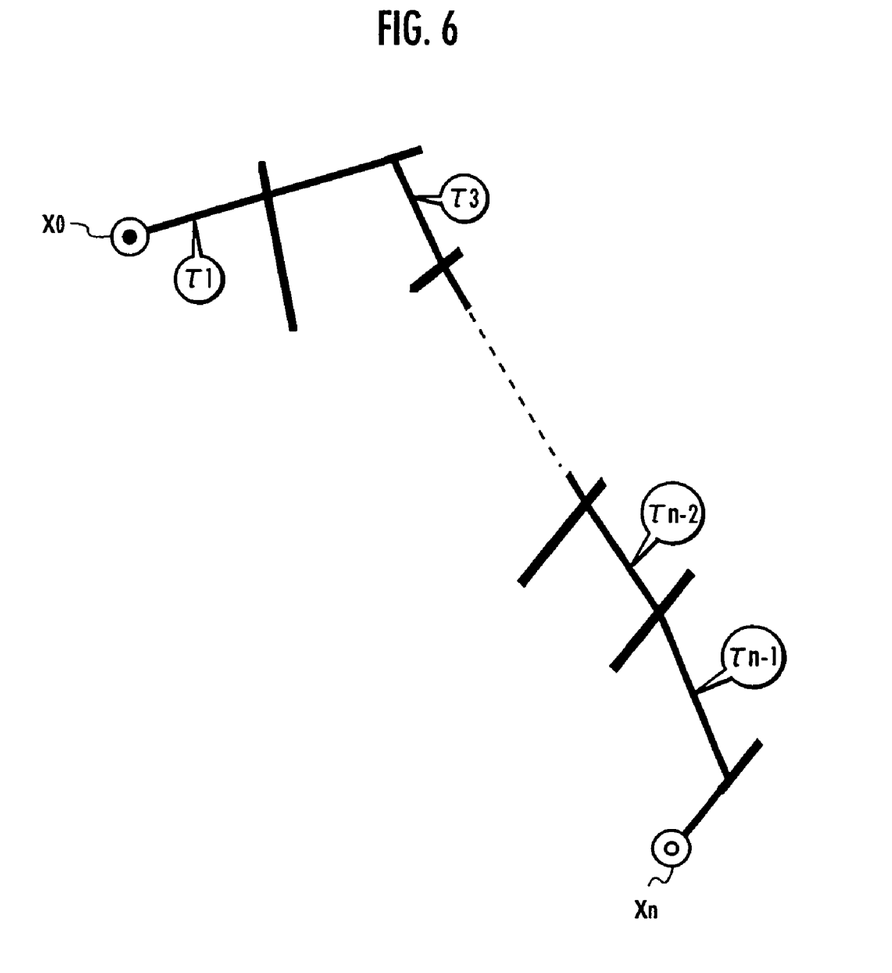
FIG. 6 is a diagram for illustrating functions of the traffic information management system according to the embodiment of the present invention.

In response to this, the control unit 210 displays the traffic information specified by the traffic information data on the image display panel 202 (step S203 in FIG. 2). As shown in FIG. 6, the traffic information displayed on the image display panel 202 includes the predicted necessary travel times $\tau_i$ for each of the unit roads $L_i$ included in the route for the automobile 20 leading from the departure position $x_0$ to the destination position $x_n$. The predicted necessary travel time may be indicated by texts, such as "The predicted necessary travel time is . . . minutes", or by a color, pattern or shape $\tau_i$ of the unit road $L_i$ depending on the predicted necessary travel time $\tau_i$ so that the predicted necessary travel time can be visually distinguished. In addition, the predicted necessary travel time $\Sigma\tau_j$ for the route including the unit roads $L_j$ (i=1, 2, . . . ) is displayed on the image display panel 202.

In the traffic information management system that functions as described above according to the present invention, when the third processing unit 130 conducts the third processing (step S130 in FIG. 2), the past time zone $b_k$ is not subjected to any limitation by the position of the reference time zone $b_0$ in one day (24 hours), such as a limitation that the past time zone $b_k$ should agree with the reference time zone $b_0$ in a day preceding the day including the relevant reference time zone $b_0$.

Therefore, the possibility that a past pattern $p_k$ resembling the reference pattern $p_0$ is retrieved increases. In addition, the prediction precision of the necessary travel time $\tau_i$ for each unit road $L_i$ and the prediction precision of the necessary travel time $\Sigma_{j=1-n}\tau_j$ for the route including the first unit road $L_1$ to n-th unit road $L_n$ are improved. Thus, the driver can grasp a more precise predicted necessary travel time via the navigation system 200 mounted on the automobile (mobile unit) 20.

In addition, the driver can grasp the degree of resemblance between the reference pattern $p_0$ and the past pattern $p_k$ via the navigation system 200, so that he/she can estimate the prediction precision for the necessary travel time $\tau_i$ based on the degree of resemblance.

Furthermore, the duration $\Delta t$ of the reference time zone $b_0$ is set based on the length of the unit road $L_i$ (see FIG. 5(a)). Accordingly, even if a factor depending on the length of the route for the automobile 20 (see FIG. 4) varies, the prediction precision for the necessary travel time $\tau_i$ is less affected by that. Thus, the prediction precision for the necessary travel time $\tau_i$ for each unit road $L_i$ included in the route for the automobile 20 can be improved. In addition, the necessary travel time $\Sigma\tau_j$ for the mobile unit for the route can be predicted with high precision.

Furthermore, the third processing unit 130 searches for a resembling pattern in the past pattern $p_k$ within the past time zone $b_k$ which is shifted from the reference time zone $b_0$ by a predetermined time difference or less. This is due to the fact that the possibility that the condition of a factor that affects the prediction of the necessary travel time is changed becomes higher as time elapses. Thus, the possibility is avoided that prediction of the necessary travel time $\tau_i$ is based on a past pattern $p_k$ within a past time zone $b_k$ which is too long before the reference time zone $b_0$ and, thus, the prediction precision for the necessary travel time $\tau_i$ is reduced.

In addition, the "predetermined threshold" is set in accordance with the time difference between the reference time zone $b_0$ and the past time zone $b_k$. This is due to the fact that the prediction precision for the necessary travel time $\tau_i$ is likely to decrease if the prediction is based on a past pattern within a past time zone $b_k$ which is too long before the reference time zone $b_0$. Since a resembling pattern $p_k$ is retrieved with reference to the predetermined threshold, and the necessary travel time $\tau_i$ is predicted based on the resembling pattern $p_k$, the prediction precision can be prevented from being decreased.

If the second processing unit 120 recognizes a plurality of routes for the automobile 20, the second processing unit 120 may select one of the routes based on the predicted necessary travel time $\Sigma\tau_j$ predicted by the fourth processing unit 140, and the communication processing unit 150 may communicate, to the navigation system 200, the route selected by the second processing unit 120 or the traffic information data that specifies the traffic information including the predicted necessary travel time $\Sigma\tau_j$ for the route (as indicated by the arrow A4 in FIG. 2).

According to this embodiment, it is possible to let the driver know only the route of a long necessary travel time or route of a short necessary travel time via the navigation system 200.

In the embodiment described above the necessary travel time is predicted for the automobile 20. In another embodiment, however, the necessary travel time can be predicted for any mobile unit, such as a motorcycle or bicycle.

What is claimed is:

1. A road traffic information management system, comprising:

first processing means for recognizing a transition pattern of the necessary travel time for a mobile unit for each unit road;

second processing means for recognizing a route for the mobile unit including one or more unit roads by communicating with an instrument mounted on the mobile unit;

third processing means for searching, for each unit road included in the route recognized by the second processing means, for a resembling pattern that resembles a reference pattern, the reference pattern being the transition pattern within a reference time zone that has a duration and ends at a current time, the resembling pattern being a past pattern of the transition pattern within a past time zone that precedes the reference time zone and has the same duration as the reference time zone;

fourth processing means for predicting the necessary travel time required for the mobile unit to travel the route recognized by the second processing means or a unit road included in the route based on the resembling pattern retrieved by the third processing means; and communication processing means for transmitting traffic information including the necessary travel time predicted by the fourth processing means to a navigation system mounted on the mobile unit for which the route is recognized by the second processing means.

2. The traffic information management system according to claim 1, wherein the first processing means recognizes the transition pattern of the necessary travel time for the mobile unit for each unit road by communicating with an instrument which is installed on the road and is capable of detecting the velocity of the mobile unit on the road or the number of mobile units passing by the instrument per unit time.

3. The traffic information management system according to claim 1, wherein the first processing means recognizes the transition pattern of the necessary travel time for the mobile unit for each unit road by communicating with an instrument which is mounted on the mobile unit and is capable of determining the position of the mobile unit.

4. The traffic information management system according to claim 1, wherein the second processing means recognizes a current position or departure position and a destination position of the mobile unit by communicating with the navigation system on the mobile unit and then determines the route for the mobile unit leading from the current position or departure position to the destination position.

5. The traffic information management system according to claim 1, wherein the second processing means communicates with the navigation system on the mobile unit and recognizes the route for the mobile unit leading from a current position or departure position to a destination position, the route being determined by the navigation system.

6. The traffic information management system according to claim 1, wherein the second processing means recognizes a plurality of routes for the mobile unit and selects any of the routes for the mobile unit based on the necessary travel time predicted by the fourth processing means, and the communication processing means transmits, to the navigation system on the mobile unit, the traffic information including the route selected by the second processing means or the necessary travel time for the route predicted by the fourth processing means.

7. The traffic information management system according to claim 1, wherein the third processing means recognizes the length of each unit road included in the route recognized by the second processing means and determines the duration of the reference time zone for the unit road based on the length of the unit road.

8. The traffic information management system according to claim 1, wherein the third processing means searches for the resembling pattern resembling the reference pattern in the past pattern recognized by the first processing means within the past time zone which is shifted from the reference time zone by a predetermined time difference or less.

9. The traffic information management system according to claim 1, wherein the third processing means recognizes the resemblance between the reference pattern and the past pattern and retrieves, as the resembling pattern, the past pattern for which the resemblance to the reference pattern is equal to or higher than a predetermined threshold.

10. The traffic information management system according to claim 9, wherein the third processing means determines said predetermined threshold for the past pattern within the past time zone in accordance with the time difference between the reference time zone and the past time zone.

11. The traffic information management system according to claim 9, wherein the communication processing means transmits, to the navigation system on the mobile unit, the traffic information including the degree of resemblance between the reference pattern and the resembling pattern recognized by the third processing means.

12. The traffic information management system according to claim 1, wherein, for successive i-th unit roads (i=1, 2, . . . ) included in the route recognized by the second processing means, based on the resembling pattern retrieved by the third processing means, the fourth processing means predicts the necessary travel time $\tau_1$ for the mobile unit for a first unit road and predicts the necessary travel time $T_{i+1}$ for an (i+1)-th unit road at a point in time at least $\Sigma_{j=1\sim i}\tau_j$ after the current time, where $\tau_{j=1\sim i}\tau_j$ is the sum of the predicted necessary travel times for the first unit road to an i-th unit road.

13. The traffic information management system according to claim 12, wherein the communication processing means transmits, to the navigation system on the mobile unit, the traffic information including the necessary travel times $\tau_i$ for the i-th unit roads or the sum ($\Sigma_{j=1\sim i}\tau_j$) of the necessary travel times for the first to i-th unit roads predicted by the fourth processing means.

14. A method for managing road traffic information, the method comprising the steps of:

(a) recognizing a transition pattern of a necessary travel time, via processing unit, for a mobile unit for each unit road;

(b) recognizing a route for the mobile unit including one or more unit roads by communicating with an instrument mounted on the mobile unit;

(c) searching, for each unit road included in the route recognized for the mobile unit, for a resembling pattern that resembles a reference pattern, the reference pattern being the transition pattern within a reference time zone that has a duration and ends at a current time, the resembling pattern being a past pattern of the transition pattern within a past time zone that precedes the reference time zone and has the same duration as the reference time zone;

(d) predicting the necessary travel time required for the mobile unit to travel the route recognized in the step (b) or a unit road included in the route based on the resembling pattern searched in the step (c); and (e) transmitting traffic information including the necessary travel time predicted in the step (d) to a navigation system mounted on the mobile unit for which the route is recognized in the step (b).

15. The method according to claim 14, wherein step (a) comprises the steps of detecting with an instrument, which is installed on the road, the velocity of the mobile unit on the road or the number of mobile units passing by the instrument per unit time, and communicating with the instrument.

16. The method according to claim 14, wherein step (a) comprises the steps of determining a position of the mobile unit with an instrument which is mounted on the mobile unit, and communicating with the instrument.

17. The method according to claim 14, wherein step (b) comprises the steps of:
recognizing a current position or departure position and a destination position of the mobile unit by communicating with the navigation system on the mobile unit; and
determining the route for the mobile unit leading from the current position or departure position to the destination position.

18. The method according to claim 14, wherein step (b) comprises the steps of:
communicating with the navigation system on the mobile unit; and
recognizing the route for the mobile unit leading from a current position or departure position to a destination position, the route being determined by the navigation system.

19. The method according to claim 14, wherein step (b) comprises the step of recognizing a plurality of routes for the mobile unit and selecting any of the routes for the mobile unit based on the necessary travel time predicted in steps (d), and
wherein step (e) comprises the step of transmitting, to the navigation system on the mobile unit, the traffic information including the route selected in step (b) or the necessary travel time for the route predicted in step (d).

20. The method according to claim 14, wherein step (c) comprises the steps of:
recognizing the length of each unit road included in the route recognized in step (b); and
determining the duration of the reference time zone for the unit road based on the length of the unit road.

21. The method according to claim 14, wherein step (c) comprises the step of searching for the resembling pattern resembling the reference pattern in the past pattern recognized in step (a) within the past time zone which is shifted from the reference time zone by a predetermined time difference or less.

22. The method according to claim 14, wherein step (c) comprises the step of recognizing the resemblance between the reference pattern and the past pattern and retrieves, as the resembling pattern, the past pattern for which the resemblance to the reference pattern is equal to or higher than a predetermined threshold.

23. The method according to claim 22, wherein step (c) comprises the step of determining said predetermined threshold for the past pattern within the past time zone in accordance with the time difference between the reference time zone and the past time zone.

24. The method according to claim 22, wherein step (e) comprises the step of transmitting, to the navigation system on the mobile unit, the traffic information including the degree of resemblance between the reference pattern and the resembling pattern recognized in step (c).

25. The method according to claim 14, wherein step (d) comprises the step of, for successive i-th unit roads ($i=1, 2, \ldots$) included in the route recognized in step (b), based on the resembling pattern retrieved in step (c), predicting the necessary travel time $\tau_1$ for the mobile unit for a first unit road and predicts the necessary travel time $\tau_{i+1}$ for an (i+1)-th unit road at a point in time at least $\Sigma_{j=1-i}\tau_j$ after the current time, where $\Sigma_{j=1-i}\tau_j$ is the sum of the predicted necessary travel times for the first unit road to an i-th unit road.

26. The method according to claim 25, wherein step (e) comprises the step of transmitting, to the navigation system on the mobile unit, the traffic information including the necessary travel times $\tau_i$ for the i-th unit roads or the sum ($\Sigma_{j=1-i}\tau_j$) of the necessary travel times for the first to i-th unit roads predicted in the step of (d).

27. A road traffic information management system, comprising:
first processing means for recognizing a transition pattern of the necessary travel time for a mobile unit for each unit road;
second processing means for recognizing a route for the mobile unit including one or more unit roads by communicating with an instrument mounted on the mobile unit;
third processing means for searching, for each unit road included in the route recognized by the second processing means, for a resembling pattern that resembles a reference pattern recognized by the first processing means within a reference time zone in a past pattern recognized by the first processing means within a past time zone that precedes the reference time zone and has the same duration as the reference time zone;
fourth processing means for predicting the necessary travel time required for the mobile unit to travel the route recognized by the second processing means or a unit road included in the route based on the resembling pattern retrieved by the third processing means; and
communication processing means for transmitting traffic information including the necessary travel time predicted by the fourth processing means to a navigation system mounted on the mobile unit for which the route is recognized by the second processing means,
wherein the third processing means recognizes the resemblance between the reference pattern and the past pattern, determines a predetermined threshold for the past pattern with the past time zone in accordance with the time difference between the reference time zone and the past time zone, and retrieves as the resembling pattern, the past pattern for which the resemblance to the reference pattern is equal to or higher than said predetermined threshold.

* * * * *